(12) United States Patent
Diamond

(10) Patent No.: US 6,188,180 B1
(45) Date of Patent: Feb. 13, 2001

(54) IGNITION CIRCUIT FOR AUTOMOTIVE HIGH INTENSITY DISCHARGE LAMPS

(75) Inventor: Michael N. Diamond, Thousand Oaks, CA (US)

(73) Assignee: International Rectifier Corp., El Segundo, CA (US)

(*) Notice: Under 35 U.S.C. 154(b), the term of this patent shall be extended for 0 days.

(21) Appl. No.: 09/416,458

(22) Filed: Oct. 12, 1999

Related U.S. Application Data

(60) Provisional application No. 60/104,095, filed on Oct. 13, 1998.

(51) Int. Cl.$^7$ .................................................. H05B 37/00
(52) U.S. Cl. .............. 315/289; 315/209 T; 315/209 CD; 315/82; 315/DIG. 5
(58) Field of Search .................................... 315/289, 290, 315/307, 291, 240, 209 R, 209 T, 209 CD, 206, DIG. 5, DIG. 7, 308, 82

(56) References Cited

U.S. PATENT DOCUMENTS

| | | | |
|---|---|---|---|
| 4,904,907 | * 2/1990 | Allison et al. | 315/307 |
| 5,036,256 | * 7/1991 | Garrison et al. | 315/308 |
| 5,051,665 | * 9/1991 | Garrison et al. | 315/287 |
| 5,391,966 | * 2/1995 | Garrison | 315/308 |
| 5,534,753 | * 7/1996 | Blom et al. | 315/244 |

* cited by examiner

*Primary Examiner*—Haissa Philogene
(74) *Attorney, Agent, or Firm*—Ostrolenk, Faber, Gerb & Soffen, LLP

(57) ABSTRACT

An ignition circuit for a high intensity discharge (HID) lamp, comprising: first and second series coupled switching transistors connected across upper and lower voltage buses to which a source of DC voltage is connectable, the first switching transistor being connected from the second switching transistor at a common node to the upper voltage bus and the second switching transistor being connected from the common node to the lower voltage bus; a first capacitor connected, at one end, to the common node of the series coupled pair of switching transistors; a first diode having an anode connected to an opposite end of the first capacitor, and a cathode; a second capacitor coupled from the cathode of the first diode to the lower voltage bus; a second diode having an anode coupled to the upper voltage bus, and a cathode connected to the cathode of the first capacitor and the anode of the first diode; a spark gap having opposing ends and being coupled, at one end, to the cathode of the first diode; a pulse transformer having a primary winding coupled from the opposite end of the spark gap to the lower voltage bus and a secondary winding for connecting across the HID lamp; and a control circuit operable to alternatively turn on and off the first and second switching transistors, such that the spark gap is operable to deliver the pulse of current to the primary winding of the pulse transformer in synchronism with the turn on of the first switching transistor.

12 Claims, 2 Drawing Sheets

IGNITION CIRCUIT FOR AUTOMOTIVE HIGH INTENSITY DISCHARGE LAMPS

CROSS REFERENCE TO RELATED APPLICATION

The present application is based on and claims priority to U.S. Provisional Application No. 60/104,095, filed Oct. 13, 1998, entitled IGNITION CIRCUIT FOR AUTOMOTIVE HIGH INTENSITY DISCHARGE LAMPS, the entire disclosure of which is hereby incorporated by references.

BACKGROUND OF THE INVENTION

1. Field of the Invention

The present invention relates to electrical circuits for starting and restarting high intensity discharge (HID) lamps and, more particularly, to a novel circuit for producing high ignition voltage for starting an HID lamp.

2. Related Art

It is well known in the art that HID lamps commonly operate in a starting mode, an operating or steady state mode, and a restrike mode. During the starting mode, a relatively high value of starting voltage (i.e., ignition voltage) of about 25 KV is applied across electrodes of a lamp to first place the gases of the lamp into a suitable ionized condition for striking or initiating a glow breakdown state.

Automotive HID ballasts typically consist of a DC to DC converter, an H-bridge and an ignitor circuit, for example, see U.S. Pat. No. 4,904,907 to Allison.

Prior art ignitor circuits generally consist of a pulse transformer capable of producing a high voltage pulse and a drive circuit consisting of a capacitor, a spark gap and an resistor. For example, U.S. Pat. No. 5,036,256 to Garrison discloses an arc discharge ballast suitable for automotive applications consisting of a DC to DC converter, step-up transformer, rectifier and voltage doubler, energy storage circuit, and ignition transformer. In the Garrison circuit, a capacitor, resistor and spark gap form a relaxation oscillator capable of periodically pulsing the ignition transformer. The maximum charge voltage on the capacitor is limited to the supply voltage applied to the input of the relaxation oscillator.

In general, higher charge voltages are desirable since the energy stored in the capacitor is ½ $CV^2$. Indeed, higher charge voltages permit a reduction in the capacitor size while maintaining a constant amount of stored energy. One method of increasing the charge voltage above a supply voltage is to use a voltage doubler operated from an H-bridge as described in U.S. Pat. No. 5,534,753 to Blom. In this way, charge voltages of up to twice the supply voltage may be obtained. In a voltage doubler, the effective capacitance is halved since there are two energy storage capacitors in series.

Unfortunately, the prior art arc discharge ballast circuits are disadvantageous for a number of reasons which include a limitation in the reduction of the energy storage capacitor, excessive voltage pulsing of the ignition transformer and asynchronous operation of the ignition pulse circuit with respect to the H-bridge circuit.

Accordingly, there is a need in the art for an improved ignition circuit for automotive HID lamps which permits doubling the pulse voltage, reducing the size of the energy storage capacitors by more than one half, synchronization of the ignition voltage pulse with the H-bridge circuit, and limiting the number of ignition pulses per half cycle of the H-bridge.

SUMMARY OF THE INVENTION

In order to overcome the deficiencies of the prior art, the ignition circuit for an HID lamp in accordance with the invention includes first and second series coupled switching transistors connected across upper and lower voltage buses to which a source of DC voltage is connectable, the first switching transistor being connected from the second switching transistor at a common node to the upper voltage bus and the second switching transistor being connected from the common node to the lower voltage bus; a first capacitor connected, at one end, to the common node of the series coupled pair of switching transistors; a first diode having an anode connected to an opposite end of the first capacitor, and a cathode; a second capacitor coupled from the cathode of the first diode to the lower voltage bus; a second diode having an anode coupled to the upper voltage bus, and a cathode connected to the cathode of the first capacitor and the anode of the first diode; a spark gap having opposing ends and being coupled, at one end, to the cathode of the first diode; a pulse transformer having a primary winding coupled from the opposite end of the spark gap to the lower voltage bus and a secondary winding for connecting across the HID lamp; and a control circuit operable to alternatively turn on and off the first and second switching transistors, such that the spark gap is operable to deliver the pulse of current to the primary winding of the pulse transformer in synchronism with the turn on of the first switching transistor.

Other features and advantages of the present invention will become apparent from the following description of the invention which refers to the accompanying drawings.

BRIEF DESCRIPTION OF THE DRAWINGS

For the purposes of illustrating the invention, there is shown in the drawing a form which is presently preferred, it being understood, however, that the invention is not limited to the precise arrangement and instrumentality shown.

DETAILED DESCRIPTION OF THE INVENTION

Figure 1:
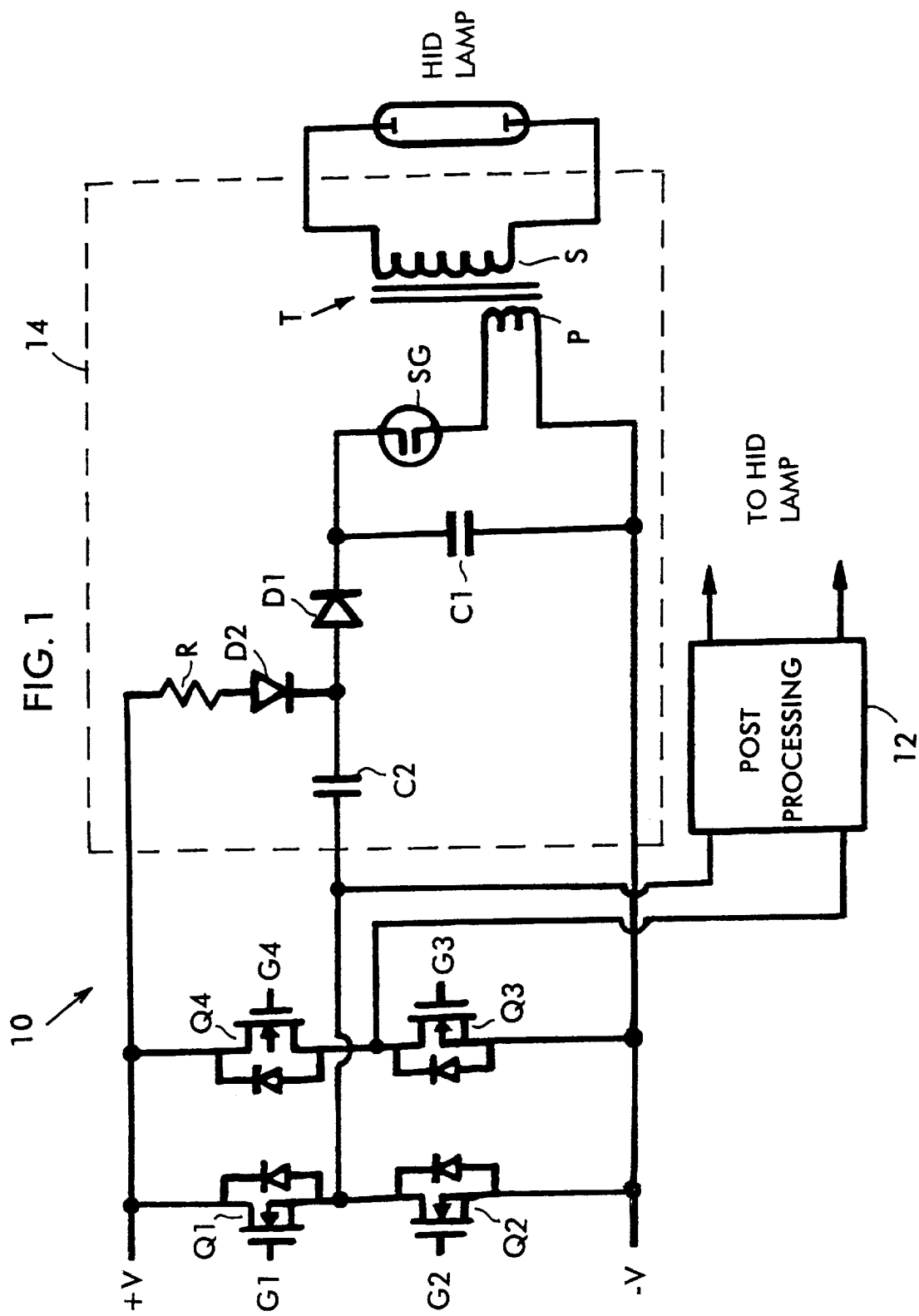
FIG. 1 is a schematic diagram showing an ignition circuit for an automotive HID lamp in accordance with the invention.

Referring now to the drawings, there is shown in FIG. 1 an ignition circuit 10 for an HID lamp. The ignition circuit 10 includes an H-bridge having switching transistors Q1–Q4 coupled across a source of DC power +V, −V. Switching transistors Q1–Q4 are preferably MOSFETs having antiparallel diodes thereacross, the gates of which, G1–G4, are controlled via a control circuit (not shown) as is well known in the art. The output from the H-bridge feeds a postprocessing circuit 12 for conditioning the output of the H-bridge for delivery to the lamp.

The ignition circuit 10 further includes a pulse circuit 14 comprising a storage capacitor C1, a spark gap SG and a pulse transformer T. The pulse circuit 14 further includes a charge pump capacitor C2, a resistor R, and diodes D1, D2 all of which are operatively coupled to one another to deliver voltage to the storage capacitor C1. In particular, one end of the charge pump capacitor C2 is coupled to the junction of transistors Q1 and Q2. The other end of the charge pump capacitor C2 is coupled to capacitor C1 through diode D1.

The pulse circuit 14 operates as follows: capacitor C1 charges to the voltage across the +V, −V terminals from the +V terminal through resistor R, diode D2, and diode D1. The spark gap SG is selected such that a voltage pulse will be delivered to the primary winding P of pulse transformer T only when the voltage stored across capacitor C1 exceeds the voltage across terminals +V, −V by a predetermined amount.

When transistor Q2 is biased on, one side of capacitor C2 is operatively coupled to the −V terminal. Accordingly, capacitor C2 charges to the voltage across terminals +V, −V through resistor R and diode D2 in the polarity shown. Subsequently, when transistor Q2 turns off and transistor Q1 turns on, the one end of capacitor C2 is operatively coupled to the +V terminal, thereby causing capacitor C1 to charge to a voltage of two times the voltage across terminals +V, −V through diode D1.

It is preferred that the respective capacitances of C1 and C2 be selected such that, for each turn on and turn off cycle of transistors Q1 and Q2, the amount of charge transferred from capacitor C2 to capacitor C1 is relatively small. Thus, the voltage across capacitor C1 rises by a modest level for each turn on and turn off of transistors Q1 and Q2 (i.e., the voltage across C1 does not rise sharply from the DC bus voltage to two times the voltage across the +V, −V terminals). Indeed, when the capacitance of C2 is selected to be less than the capacitance of C1, the voltage increase across capacitor C1 in response to a transfer of charge from C2 to C1 can be controlled incrementally.

Figure 2:
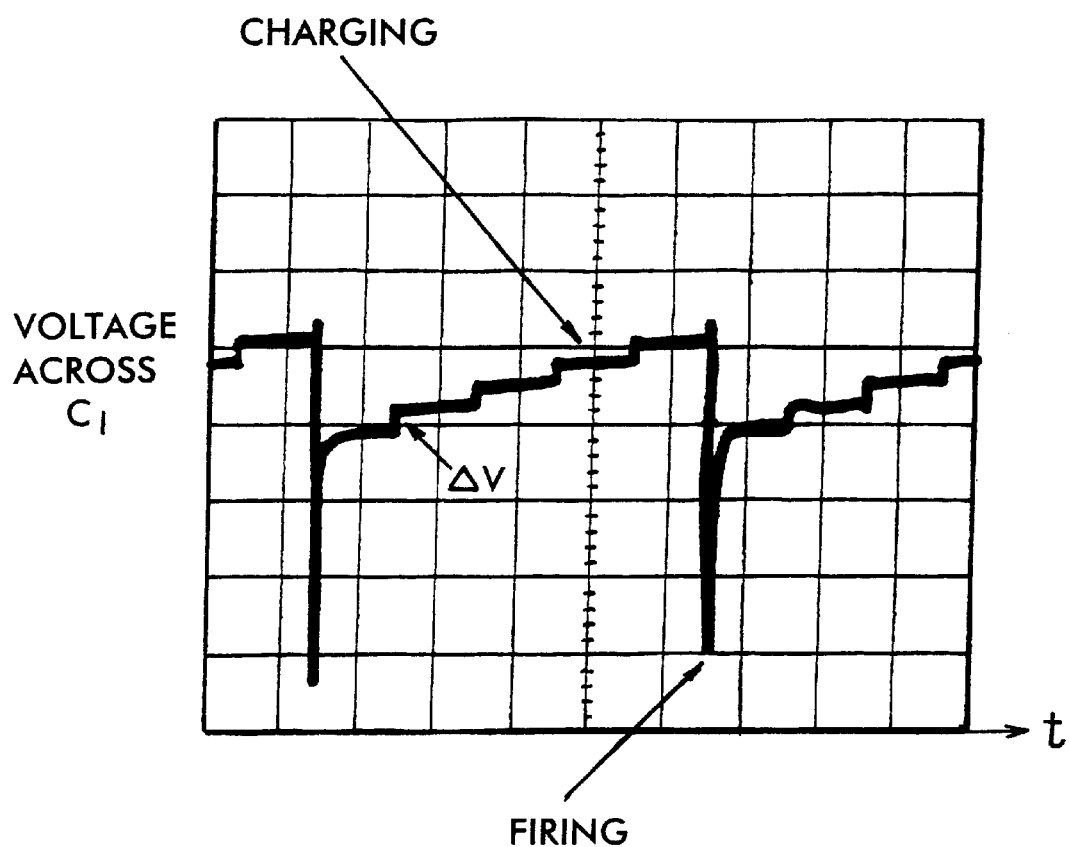
FIG. 2 is a graph showing the voltage waveform on the storage capacitor in the circuit of FIG. 1.

With reference to FIG. 2, the voltage stored across capacitor C1 as a function of time is shown. For each turn on cycle of transistors Q1, Q2, an amount of charge is transferred from capacitor C2 to capacitor C1 through diode D1 which causes the voltage across capacitor C1 to rise by an amount $\Delta V$ as shown. The sizing of capacitor C2 and C1 and the selection of the spark gap SG are designed such that approximately five turn on and turn off cycles of transistors Q1, Q2 are obtained before the voltage across capacitors C1 reaches a sufficiently high voltage to arc across the spark gap SG and produce a current pulse in the primary winding P of the pulse transformer T.

It is noted that the step-like charging characteristic of capacitor C1 is that of a charge pump circuit where the charging of C1 is synchronized to the turn on and turn off times of transistors Q1, Q2. Consequently, the firing of the primary winding P of the pulse transformer T is synchronized to the turn on time of transistor Q1.

Advantageously, because the voltage pulse delivered to the lamp is synchronized to the turn on of transistor Q1, the control scheme utilized to drive the H-bridge is significantly simplified. Further, only one ignition pulse per half the cycle of the H-bridge is produced. Still further, the capacitances selected for capacitors C1 and C2 may be reduced below those required for prior art circuits employing, for example, voltage doubler circuits. Thus, the circuit of the present invention is capable of storing a voltage of up to two times the terminal voltage across the +V, −V terminals while reducing the required storage capacitance below that of the prior art.

Although the present invention has been described in relation to particular embodiments thereof, many other variations and modifications and other uses will become apparent to those skilled in the art. It is preferred, therefore, that the present invention not be limited by the specific disclosure herein, but rather by the appended claims.

What is claimed is:

1. An ignition circuit for a high intensity discharge (HID) lamp, comprising:

a series coupled pair of switching transistors being connected to one another at a common node and the pair being connected across upper and lower voltage buses to which a source of DC voltage is connectable;

a first capacitor connected, at one end, to the common node of the series coupled pair of switching transistors;

a first diode having an anode connected to an opposite end of the first capacitor, and a cathode;

a second capacitor coupled from the cathode of the first diode to the lower voltage bus;

a second diode having an anode coupled to the upper voltage bus, and a cathode connected to the cathode of the first capacitor and the anode of the first diode;

a spark gap having opposing ends and being coupled, at one end, to the cathode of the first diode; and a pulse transformer having a primary winding coupled from the opposite end of the spark gap to the lower voltage bus and a secondary winding for connecting across the HID lamp.

2. The ignition circuit of claim 1, further comprising a control circuit operable to alternatively turn on and off the switching transistors.

3. The ignition circuit of claim 1, wherein the spark gap is operable to deliver a pulse of current to the primary winding of the pulse transformer when a voltage across the second capacitor has reached a predetermined threshold.

4. The ignition circuit of claim 3, wherein the predetermined threshold is greater than the DC source of voltage.

5. The ignition circuit of claim 4, wherein a capacitance of the first capacitor is lower than a capacitance of the second capacitor.

6. The ignition circuit of claim 5, wherein the capacitance of the first capacitor is lower than the capacitance of the second capacitor such that about five turn on/off cycles of the switching transistors results in the voltage across the second capacitor reaching the threshold.

7. The ignition circuit of claim 6, wherein the spark gap is operable to deliver the pulse of current to the primary winding of the pulse transformer in synchronism with the turn on of an upper one of the series coupled switching transistors, the upper switching transistor being coupled from the common node to the upper voltage bus.

8. An ignition circuit for a high intensity discharge (HID) lamp, comprising:

first and second series coupled switching transistors connected across upper and lower voltage buses to which a source of DC voltage is connectable, the first switching transistor being connected from the second switching transistor at a common node to the upper voltage bus and the second switching transistor being connected from the common node to the lower voltage bus;

a first capacitor connected, at one end, to the common node of the series coupled pair of switching transistors;

a first diode having an anode connected to an opposite end of the first capacitor, and a cathode;

a second capacitor coupled from the cathode of the first diode to the lower voltage bus;

a second diode having an anode coupled to the upper voltage bus, and a cathode connected to the cathode of the first capacitor and the anode of the first diode;

a spark gap having opposing ends and being coupled, at one end, to the cathode of the first diode;

a pulse transformer having a primary winding coupled from the opposite end of the spark gap to the lower voltage bus and a secondary winding for connecting across the HID lamp; and a control circuit operable to alternatively turn on and off the first and second switching transistors, such that the spark gap is operable to deliver the pulse of current to the primary winding of the pulse transformer in synchronism with the turn on of the first switching transistor.

9. The ignition circuit of claim 8, wherein the spark gap is operable to deliver a pulse of current to the primary winding of the pulse transformer when a voltage across the second capacitor has reached a predetermined threshold.

10. The ignition circuit of claim 9, wherein the predetermined threshold is greater than the DC source of voltage.

11. The ignition circuit of claim 8, wherein a capacitance of the first capacitor is lower than a capacitance of the second capacitor.

12. The ignition circuit of claim 11, wherein the capacitance of the first capacitor is lower than the capacitance of the second capacitor such that about five turn on/off cycles of the switching transistors results in the voltage across the second capacitor reaching the threshold.

* * * * *